(12) United States Patent
Langer et al.

(10) Patent No.: US 8,002,324 B2
(45) Date of Patent: Aug. 23, 2011

(54) MOTOR VEHICLE

(75) Inventors: Uwe Langer, Boeblingen (DE); Marc Schindler, Braunschweig (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 12/612,850

(22) Filed: Nov. 5, 2009

(65) Prior Publication Data

US 2010/0156130 A1  Jun. 24, 2010

(30) Foreign Application Priority Data

Dec. 19, 2008  (DE) .......................... 10 2008 064 082

(51) Int. Cl.
*B60R 11/06* (2006.01)

(52) U.S. Cl. ...................... 296/37.1; 296/37.16; 224/543

(58) Field of Classification Search ...... 296/37.1–37.16; 224/42.12–42.14, 539, 542, 543, 544

See application file for complete search history.

(56) References Cited

U.S. PATENT DOCUMENTS

| | | | | |
|---|---|---|---|---|
| 5,799,845 A | * | 9/1998 | Matsushita | ............... 224/42.14 |
| 7,526,098 B2 | | 4/2009 | Rosental et al. | |
| 2004/0089487 A1 | * | 5/2004 | Rowley et al. | ............... 180/68.5 |
| 2008/0078596 A1 | * | 4/2008 | Kim et al. | ................... 180/68.5 |

FOREIGN PATENT DOCUMENTS

| | | |
|---|---|---|
| DE | 17 18 045 | 11/1955 |
| DE | 31 13 668 | 10/1982 |
| DE | 197 28 912 | 1/1999 |
| DE | 198 56 314 | 6/2000 |
| DE | 100 25 451 | 11/2001 |
| DE | 101 08 106 | 8/2002 |
| DE | 101 59 719 | 3/2003 |
| DE | 20 2004 002 455 | 4/2004 |
| DE | 102 61 104 | 7/2004 |
| DE | 103 16 677 | 9/2004 |
| DE | 10 2006 020 953 | 1/2008 |

* cited by examiner

*Primary Examiner* — Dennis H Pedder

(74) *Attorney, Agent, or Firm* — Gerald E. Hespos; Michael J. Porco

(57) ABSTRACT

A motor vehicle has a luggage space bounded in part by a luggage space wall that has a closeable opening to a storage space in which a technical unit of the motor vehicle is accommodated. To make optimum use of the available storage space in the motor vehicle, a holding element is seated on the technical unit and has at least one recess for holding a technical device of the motor vehicle.

10 Claims, 1 Drawing Sheet

MOTOR VEHICLE

CROSS-REFERENCE TO RELATED APPLICATIONS

This application claims priority under 35 USC 119 to German Patent Application No. 10 2008 064 082.4 filed on Dec. 19, 2008, the entire disclosure of which is incorporated herein by reference.

BACKGROUND OF THE INVENTION

1. Field of the Invention

The invention relates to a motor vehicle with a luggage space that is bounded in part by a luggage space wall that has a closeable opening to a storage space in which a technical unit of the motor vehicle is accommodated.

2. Description of the Related Art

German laid-open specification DE 10 2006 020 953 A1 discloses a device for holding an object that is used in a motor vehicle, such as a warning triangle, a first-aid kit or the like, in a luggage space region of the motor vehicle.

The object of the invention is to make optimum use of the available storage space in a motor vehicle.

SUMMARY OF THE INVENTION

The invention relates to a motor vehicle with a luggage space that is bounded in part by a luggage space wall that has a closeable opening for accessing a storage space in which a technical unit of the motor vehicle is accommodated. A holding element with at least one recess for holding a technical device of the motor vehicle is seated on the technical unit. The technical unit is operatively connected to the motor vehicle, but can be removed from and reinstalled into the storage space, for example, for repair purposes. The technical device is a loose object that can be taken out of the storage space by a user of the motor vehicle if and as required, for example to fix a breakdown of the motor vehicle. The holding element enables a simple accommodation of the technical device in the storage space in a stable manner. The mounting of the holding element on the technical unit assures that the available storage space can be exploited optimally.

The holding element preferably is formed from a plastic foam. The hardness, strength, elasticity, cell structure, density and the like of the plastic foam are geared to the size and the weight of the technical device.

The shape of the holding element preferably is tailored in part to the shape of the technical unit on which the holding element is seated. Thus, the holding element can be fastened and/or mounted in a simple and stable manner on the technical unit without requiring further fastening means.

The shape of the holding element preferably is tailored to the shape of the technical device that is accommodated, at least in part, in the recess of the holding element. Thus, the technical device to be mounted and/or fastened in a simple and stable manner on or in the holding element without further fastening means being required.

The technical unit may comprises an evaporator and/or a battery. The battery is, for example, a 12-volt battery for supplying the electrical system of the motor vehicle. The evaporator may belong to an air-conditioning system of the motor vehicle. The technical unit may alternatively or additionally comprise other components, functional parts or accessories of the motor vehicle.

The technical device may comprise a tool and/or a breakdown aid. The tool, for example, may be a compressor for pumping up tires of the motor vehicle. The breakdown aid, for example, may be a puncture-sealing system.

The opening to the storage space preferably can be closed repeatedly in a nondestructive manner by a flap. The flap can be mounted pivotably on the luggage space wall by a hinge. However, the flap also can be mounted removably on the luggage space wall so as to be detachable therefrom, for example by snap-connection elements.

The holding element preferably is fastened to the technical unit so that the holding element can be separated repeatedly therefrom in a nondestructive manner, for example by means of a hook-and-loop fastener.

Further advantages, features and details of the invention will become apparent from the description below in which different exemplary embodiments are described in detail with reference to the drawing.

DETAILED DESCRIPTION OF THE PREFERRED EMBODIMENT

Figure 1:
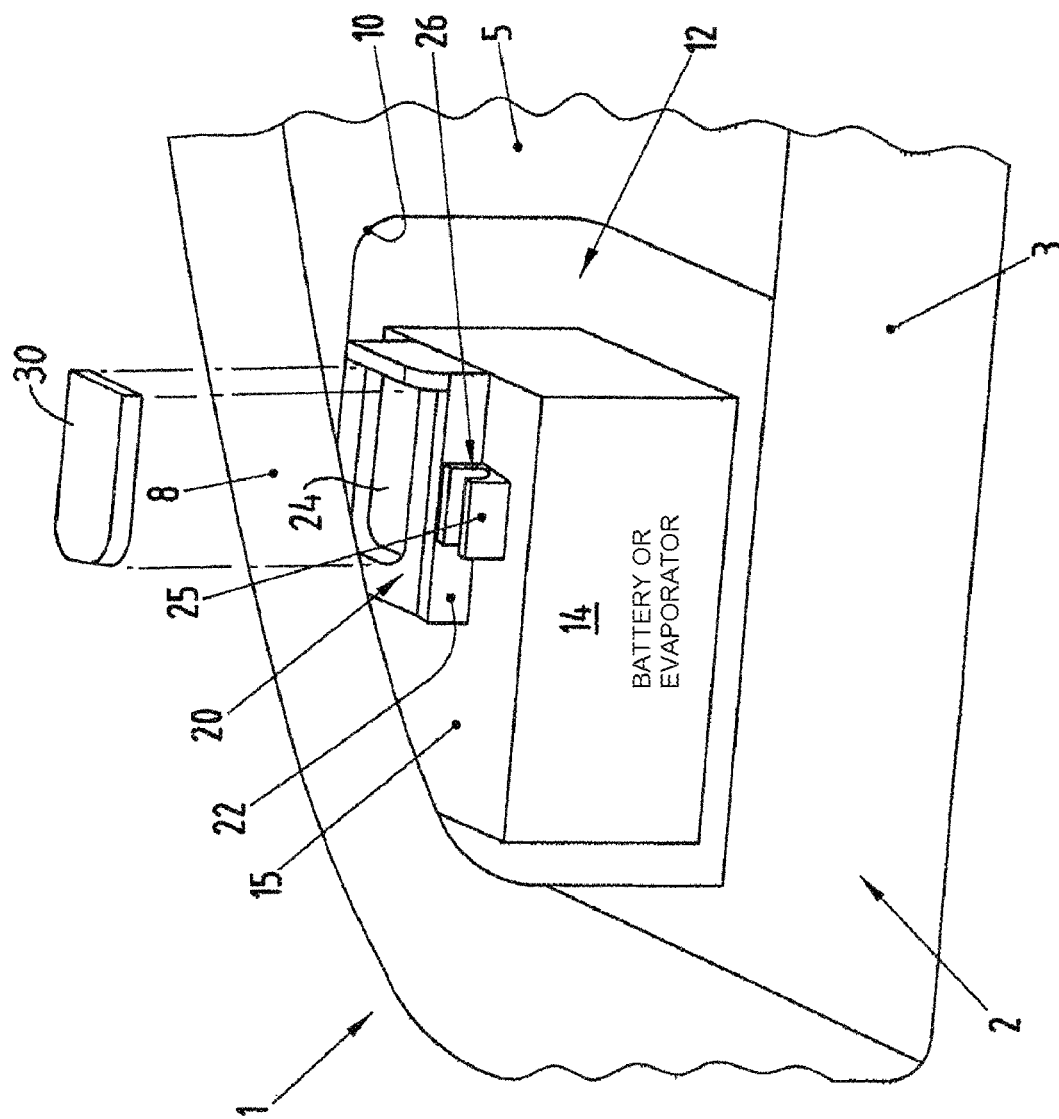
FIG. 1 is a perspective view of a motor vehicle with an open luggage space.

A motor vehicle in accordance with the invention is identified generally by the numeral 1 in FIG. 1. The motor vehicle 1 has a luggage space 2 that is depicted in the open state and in a highly simplified form. The luggage space 2 is bounded to the bottom by a luggage space floor 3 and laterally by a luggage space wall 5. The luggage space wall 5 extends below a D-pillar 8 of a supporting structure of the motor vehicle 1 and is also is referred to as a luggage space side wall or as a side wall.

The luggage space side wall 5 has an opening 10 to a storage space 12 between the side wall 5 and an outer skin of the vehicle. Parts of the supporting structure of the motor vehicle can be arranged in the storage space 12 so that a technical unit 14, such as a battery for supplying the electrical system of the motor vehicle or an evaporator that belongs to an air-conditioning system of the motor vehicle, can be fastened in a stable manner. The technical unit 14 substantially has the shape of a cuboid, but can also have a completely different shape depending on its function.

Importantly, a holding element 20 is seated on an upper side 15 of the technical unit 14 and also has substantially the shape of a cuboid 22. The holding element 20 is formed from a plastic foam and has a recess 24 to accommodate, at least in part, a technical device 30, such as a breakdown assistance kit.

The shape of the recess 24 is tailored to the shape of the technical device 30 in such a way that the technical device 30 can be mounted in a stable manner, and preferably without further fastening means. For that purpose, the recess 24 can be slightly smaller than the technical device 30 to be accommodated so that the technical device is clamped in the recess 24 and held by resilient restoring forces of the foamed plastic of the holding element 20 even when the motor vehicle is in operation, to ensure that the technical device 30 is mounted in a stable manner on a permanent basis.

The holding element 20 also comprises an attachment 25 having a further recess 26 to accommodate a further technical device 32, such as a compressor. The further technical device also preferably is held in the recess 24 by resilient clamping forces exerted by the periphery of the recess 24.

The shape of the holding element 20 also is tailored to the shape of the upper side 15 of the technical unit 14. In the present case, the underside of the holding element 20 and the upper side 15 of the technical unit 14 both can be planar.

The upper side 15 of the technical unit 14 and the underside of the holding element 20 preferably are provided with depressions/elevations that allow a positive fit between the holding element 20 and the technical unit 14. The positive fit ensures that the holding element 20 is retained in a stable manner on the technical unit 14.

Alternatively or additionally, the holding element 20 can be fastened to the technical unit 14, for example, by hook-and-loop fastener elements or by adhesive bonding.

The opening 10 can be closed by a flap 34 or a cover or a wall liner part that conceals the technical device 24 when the opening 10 is in the closed state. Moreover, the holding element 20 or the technical device can be fixed in the storage space 12 by the cover or the flap or the wall liner part.

What is claimed is:

1. A motor vehicle, comprising:
   a luggage space bounded in part by a luggage space wall;
   a storage space on a side of the luggage space wall opposite the luggage space;
   a closable opening in the luggage space wall for providing communication between the luggage space and the storage space;
   a technical unit of the motor vehicle accommodated in the storage space, the technical unit being a battery for supplying the electrical system of the motor vehicle or an evaporator of an air conditioning system of the motor vehicle; and
   a holding element seated on and fastened to the technical unit and having at least one recess for releasably holding a technical device of the motor vehicle.

2. The motor vehicle of claim 1, wherein the holding element is formed from a plastic foam.

3. The motor vehicle of claim 1, wherein the holding element has a shape tailored in part to the shape of the technical unit on which the holding element is seated.

4. The motor vehicle of claim 3, characterized in that the shape of the holding element further has a shape tailored to a shape of the technical device to be accommodated in the recess of the holding element.

5. The motor vehicle of claim 1, wherein the technical device comprises a tool or a breakdown aid.

6. The motor vehicle of claim 1, further comprising a flap for repeatedly and nondestructively closing the opening to the storage space.

7. The motor vehicle of claim 1, wherein the holding element is fastened to the technical unit removably.

8. A motor vehicle, comprising:
   a luggage space bounded in part by a luggage space wall;
   a storage space on a side of the luggage space wall opposite the luggage space;
   a closable opening in the luggage space wall for providing communication between the luggage space and the storage space;
   a technical unit operatively connected to the motor vehicle and accommodated in the storage space, the technical unit being a battery for supplying the electrical system of the motor vehicle or an evaporator for an air conditioning system of the motor vehicle;
   a holding element formed from a plastic material and fastened to the technical unit, the holding element having at least one recess formed therein; and
   a technical device removably mounted in the recess of the holding element and removably held by engagement with surfaces of the holding element defining the recess.

9. The motor vehicle of claim 8, wherein the technical device comprises a tool or a breakdown aid.

10. A motor vehicle, comprising:
    a luggage space bounded in part by a luggage space wall;
    a storage space on a side of the luggage space wall opposite the luggage space;
    a closable opening in the luggage space wall for providing communication between the luggage space and the storage space;
    an evaporator of an air conditioning unit of the motor vehicle accommodated in the storage space; and
    a holding element seated on and fastened removably to the evaporator and having at least one recess for releasably holding a tool or breakdown aid of the motor vehicle.

* * * * *